US012195374B1

(12) United States Patent
Al-Anzi (10) Patent No.: US 12,195,374 B1
(45) Date of Patent: Jan. 14, 2025

(54) PLUNGING LIQUID JET REACTOR AND WATER TREATMENT SYSTEM

(71) Applicant: KUWAIT UNIVERSITY, Safat (KW)

(72) Inventor: Badar Shafaqa Al-Anzi, Safat (KW)

(73) Assignee: KUWAIT UNIVERSITY, Safat (KW)

( * ) Notice: Subject to any disclaimer, the term of this patent is extended or adjusted under 35 U.S.C. 154(b) by 0 days.

(21) Appl. No.: 18/625,139

(22) Filed: Apr. 2, 2024

(51) Int. Cl.
| | |
|---|---|
| *B01F 23/232* | (2022.01) |
| *C02F 1/44* | (2023.01) |
| *C02F 1/74* | (2023.01) |
| *C02F 103/08* | (2006.01) |

(52) U.S. Cl.
CPC ............... *C02F 1/74* (2013.01); *C02F 1/441* (2013.01); *C02F 1/442* (2013.01); *C02F 1/444* (2013.01); *B01F 23/2322* (2022.01); *B01F 23/23231* (2022.01); *C02F 2103/08* (2013.01); *C02F 2209/40* (2013.01); *C02F 2301/046* (2013.01)

(58) Field of Classification Search
CPC .......... C02F 1/441; C02F 1/442; C02F 1/444; B01F 23/2322; B01F 23/23231
See application file for complete search history.

(56) References Cited

U.S. PATENT DOCUMENTS

| | | | |
|---|---|---|---|
| 3,417,870 A | 12/1968 | Bray | |
| 3,456,802 A | 7/1969 | Cole | |
| 4,125,463 A | 11/1978 | Chenowith | |
| 4,702,842 A | 10/1987 | Lapierre | |
| 6,348,148 B1 | 2/2002 | Bosley | |
| 6,406,622 B1 | 6/2002 | Tsuihiji et al. | |
| 7,520,981 B2 | 4/2009 | Barber | |
| 10,513,446 B2 | 12/2019 | Vuong | |
| 11,898,580 B2 * | 2/2024 | Al-Anzi | F15B 11/072 |
| 2022/0176327 A1 * | 6/2022 | Al-Anzi | B01F 25/53 |

FOREIGN PATENT DOCUMENTS

AU  2005262928 B2  1/2006

* cited by examiner

*Primary Examiner* — Bradley R Spies
(74) *Attorney, Agent, or Firm* — Nath, Goldberg & Meyer; Joshua B. Goldberg (57) ABSTRACT

A plunging liquid jet reactor and water treatment system is provided including a supply water tank. A downcomer within the supply water tank defines a hollow column having an upper end and open lower end. Supply water is pumped to a nozzle on the upper end of the downcomer. The nozzle generates a liquid jet downward in the hollow column. A filter having at least one semi-permeable membrane surrounds the downcomer. A collection tray is mounted between the filter and the supply tank for collecting treated water pushed upward between the filter and the downcomer. A pressure difference between supply water surrounding the filter and water within the filter causes water molecules to pass through the semi-permeable membrane and form treated water which is gathered on the collection tray. Depending on the filter medium and number of stages, the system may be employed in water desalination, microfiltration, nanofiltration, and/or ultrafiltration.

13 Claims, 9 Drawing Sheets

PLUNGING LIQUID JET REACTOR AND WATER TREATMENT SYSTEM

BACKGROUND

Field

The disclosure of the present patent application relates to water treatment, and particularly to a water treatment system using a plunging liquid jet reactor.

Description of Related Art

Aeration is one of the processes employed in various air-water contactors, such as an aquarium, flotation devices, biological treatment in wastewater, etc. In a wastewater process, air is introduced in the secondary stage (biological) using convectional technologies to increase the concentration of Dissolved Oxygen (DO) (usually 2.0 ppm) needed for bacteria to breathe and consume organic compounds. Certain environmental problems, such as contamination of seawater by wastewater, require efficient and immediate aeration because this contamination will ultimately lead to oxygen depletion, and consequently will destroy the aquatic life (e.g., the fish kill phenomenon) unless dissolved oxygen is restored quickly. In this case, an aeration technology is required to promote aeration phenomena and increase dissolved oxygen concentration (DO) into water immediately. Not only for this purpose, but also aerators can be used to remove unwanted gases from the atmosphere to dissolve them into water.

A plunging liquid jet reactor (PLJR) is an unconventional apparatus and process that provides efficient aeration and rigorous mixing at low cost. Such a system is demonstrated in U.S. Pat. No. 8,668,187B2 to the present inventor, which is herein incorporated by reference. Up until now, all of the applications of plunging liquid jet reactor systems have been related to aeration and rigorous mixing. However, an ongoing need exists for low cost systems of water treatment, such as desalination, ultrafiltration, microfiltration, and nanofiltration among others.

Desalination plays a critical role in regions like Kuwait and the Middle East due to their arid climate and limited freshwater resources. With limited access to natural sources of freshwater such as rivers and lakes, these regions heavily rely on desalination to meet their growing water demands for agriculture, industry, and domestic use. Desalination provides a sustainable solution to ensure a stable and reliable water supply, helping to alleviate water scarcity and support economic development in these water-stressed regions. By converting seawater into potable water, desalination helps mitigate the impacts of droughts and population growth, ensuring water security for communities and fostering socio-economic stability in the region.

Thus, new configurations of plunging liquid jet reactor systems solving the aforementioned problems are desired.

SUMMARY

A plunging liquid jet reactor and water treatment system is disclosed. The system includes a supply tank holding supply water, the tank including one or more fluid inlets and one or more fluid outlets. A downcomer is included and has an upper end and an open lower end, the downcomer defining a hollow column positioned within the supply tank. A pump and one or more conduits are included for pumping supply water to a nozzle mounted on the upper end of the downcomer. The nozzle is adapted for receiving pressurized supply water from the pump and configured to generate a liquid jet downward in the hollow column. A filter surrounds the downcomer, the filter having one or more vertical sidewalls and a base. At least one wall of the filter is a semi-permeable membrane.

A collection tray is mounted between the filter and the supply tank for collecting treated water which has been pushed upward through an annulus between the filter and downcomer. A pressure difference is created between supply water surrounding the filter and water within the filter. The pressure difference causes water molecules from supply water surrounding the filter to pass through the semi-permeable membrane and form treated water which is gathered in the collection tray. A portion of the treated water may be fed into the supply water which is directed to the nozzle. Another portion of the treated water may be collected as a final product or fed to a secondary treatment stage.

In a non-limiting embodiment, water is circulated by the pump from an outlet of the supply tank to the nozzle. In other embodiments, the pump may circulate water from an external supply source to the nozzle. In addition, the pump may circulate water from an outlet of the supply tank to the nozzle and from an external supply source to the nozzle.

In a non-limiting embodiment, the plunging liquid jet reactor and liquid treatment system is used in a desalination process in which the supply tank holds saltwater and the filter is a reverse osmosis filter. In other embodiments, the filter may be an ultrafiltration filter, a nanofiltration filter, or a microfiltration filter. A rotameter may be provided to measure the flow rate of fluid from the pump to the nozzle.

In an embodiment, the one or more vertical walls and base of the filter are semi-permeable membranes. In a separate embodiment, the one or more vertical walls of the filter are impermeable membranes and the base of the filter is a semi-permeable membrane.

In an embodiment, a multi-stage fluid treatment system is provided using two or more plunging liquid jet reactors and fluid treatment systems.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

Figure 1:
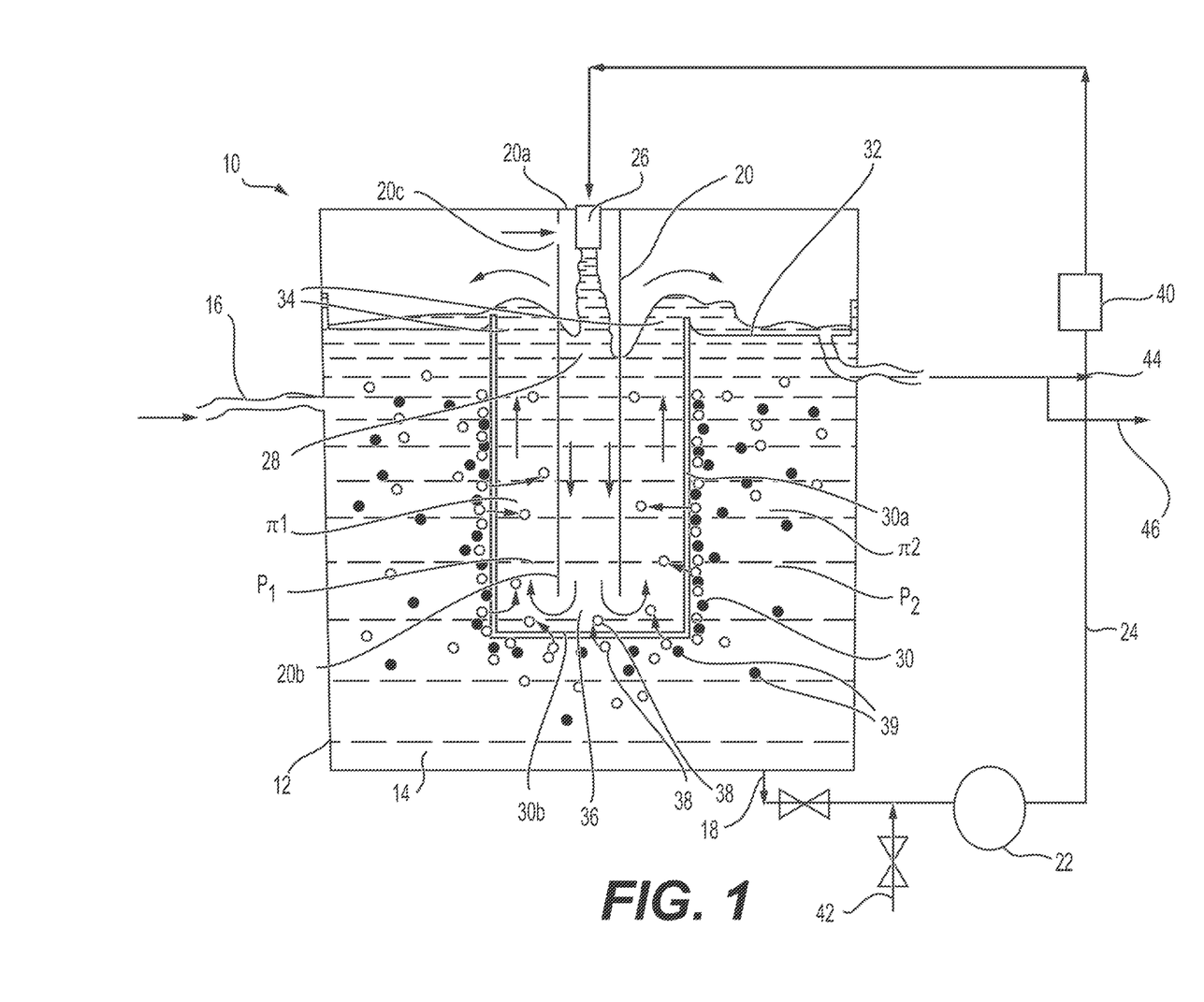
FIG. 1 is a diagram of a plunging liquid jet reactor and water treatment system.

A plunging liquid jet reactor (PLJR) and water treatment system 10 is disclosed, water treatment system 10 including a supply tank 12 holding supply water 14. The supply tank 12 includes one or more fluid inlets 16 for entry of the supply water 14 and one or more fluid outlets 18 for discharge of the supply water 14. A downcomer 20 has an upper end 20a and an open lower end 20b, the downcomer 20 defining a hollow column positioned within the supply tank 12. One or more bleed passages 20c may be provided in downcomer 20 for passage of ambient air. A pump 22 and one or more conduits 24 are included for pumping supply water to a nozzle 26 mounted on the upper end 20a of the downcomer 20.

In a non-limiting example, pump 22 circulates supply water 14 from outlet 18 of the supply tank 12 to the nozzle 26. In addition, an external water supply source 42 may provide supply water to pump 22 either exclusively, or in addition to the water coming from outlet 18 of supply tank 12. The nozzle 26 is configured to generate a liquid jet 28 downward in the hollow column forming downcomer 20. A filter 30 surrounds the downcomer 20, the filter 30 having one or more vertical sidewalls 30a and a base 30b. At least one wall 30a or the base 30b of the filter is a semi-permeable membrane. A rotameter 40 may be provided to measure the flow rate of fluid from the pump 22 to the nozzle 26.

A collection tray 32 is mounted between the filter 30 and the supply tank 12 for collecting treated water 34 which has been pushed upward through an annulus between an inner surface of the one or more vertical sidewalls 30a of the filter and an outer surface of the downcomer 20. A pressure difference ($\Delta P$) is created between water 36 within filter 30 at pressure P1 (osmotic pressure $\pi 1$) and supply water 14 surrounding the filter 20 at pressure P2 (osmotic pressure $\pi 2$). In the case where the pressure difference $\Delta P$ is greater than the osmotic difference ($\Delta \pi$) across the membrane, water molecules 38 from supply water 14 pass through the semi-permeable membrane of filter 30 and form treated water 34, which is gathered on the collection tray 32. Particulate molecules 39 (such as salt molecules for example) are blocked from passing through the semi-permeable membrane. A portion 44 of the treated water 34 may be mixed with the supply water fed to nozzle 26. Another portion 46 of the treated water may be collected as a final product or sent to a second treatment stage to be discussed in greater detail below with respect to FIG. 3.

Depending on the desired application, the semi-permeable membrane of filter 30 may be formed of various materials. For desalination, a reverse osmosis membrane may be used. Such semi-permeable membranes are typically made of materials such as cellulose acetate, polyamide, or thin-film composite (TFC) materials and function by allowing water molecules to pass through while blocking dissolved salts and other impurities.

For an ultrafiltration application, filter 30 may include for example, a polymeric membrane such as polysulfone, polyethersulfone, or polyvinylidene fluoride (PVDF). Such membranes for ultrafiltration have larger pore sizes compared to reverse osmosis membranes, allowing them to effectively remove particles, colloids, bacteria, and some viruses from water. For nanofiltration, filter 30 may include a thin-film composite membrane similar to a reverse osmosis membrane but having a larger pore size, which allows for selective removal of divalent ions, such as calcium and magnesium, as well as certain organic molecules. Thin-film composite membranes typically include a selective polymeric layer supported by a porous substrate.

For a microfiltration application, filter 30 may include for example, a ceramic membrane or a polymeric membrane. Ceramic membranes are often made of ceramic materials such as alumina, titania, or zirconia. These membranes have larger pore sizes compared to ultrafiltration and nanofiltration membranes, allowing them to effectively remove suspended solids, bacteria, and some larger microorganisms from water. A polymeric microfiltration membrane is similar to those used in ultrafiltration and are typically made of materials such as polysulfone, polyethersulfone, or PVDF. Polymeric microfiltration membranes are used for applications where ceramic membranes may not be suitable due to cost or other factors.

In addition to the type of material used, the amount of water flow rate or flux through the semi-permeable membrane may vary depending on the intended application. For a desalination process, the amount of flux through the membrane is calculated similar to Reverse Osmosis principles (RO), as follows:

$$Q_{Ie} \text{ Or } J_{Ie} = A(\Delta P - \Delta \pi)$$

Where $Q_{Ie}$ and $J_{Ie}$ are the induced water flow rate and water flux, respectively. A=water permeability coefficient of the semi-permeable membrane, $\Delta \pi$ is the change in osmotic pressure between the low and high salinity solutions, or the water inside and outside the filter respectively, and $\Delta P$ is the change in hydrostatic pressure between the low and high salinity solutions across the semi-permeable membrane.

Figure 2A:
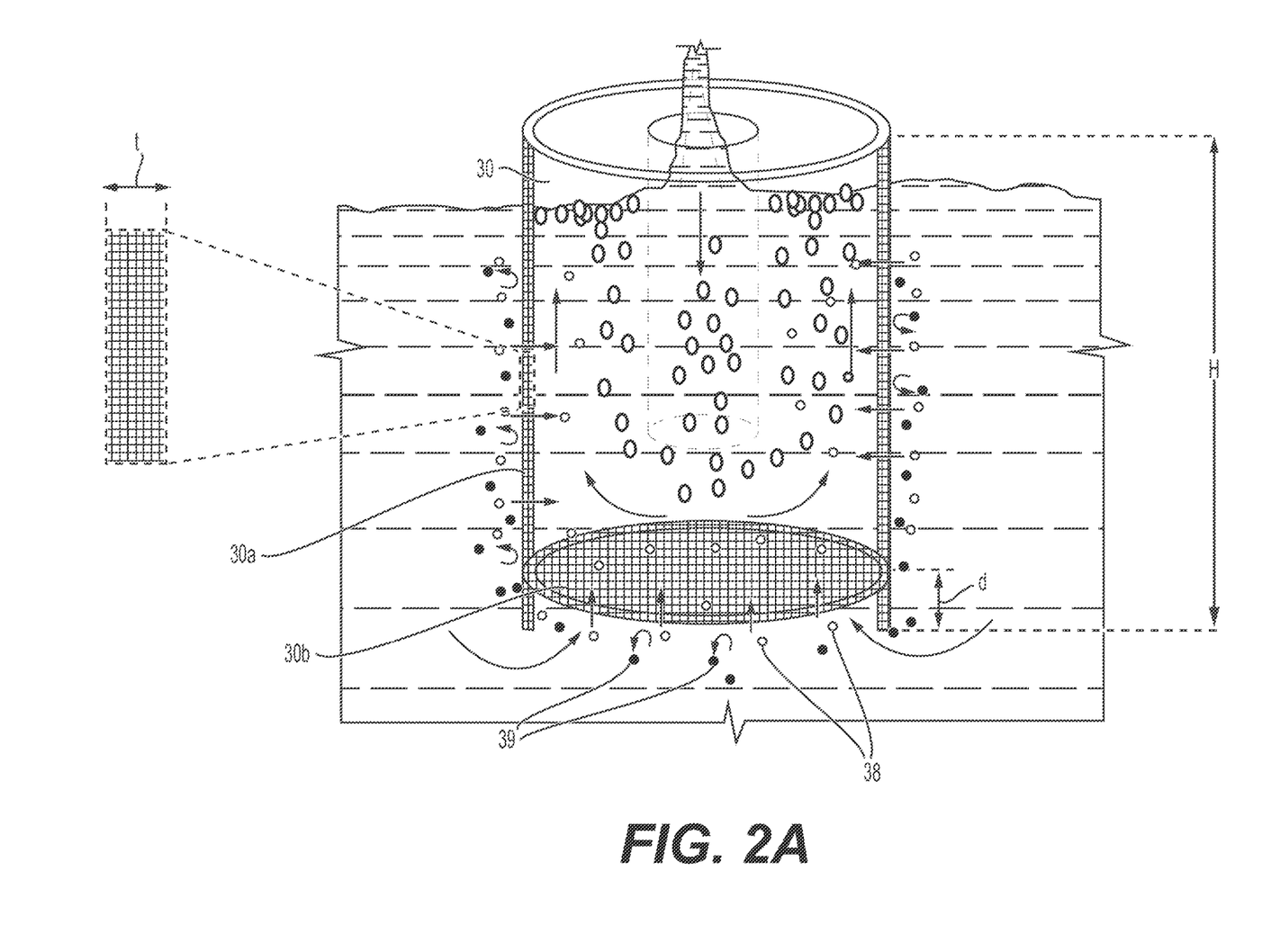
FIG. 2A is an embodiment of a filter having a semi-permeable membrane forming the vertical walls and base.
Figure 2B:
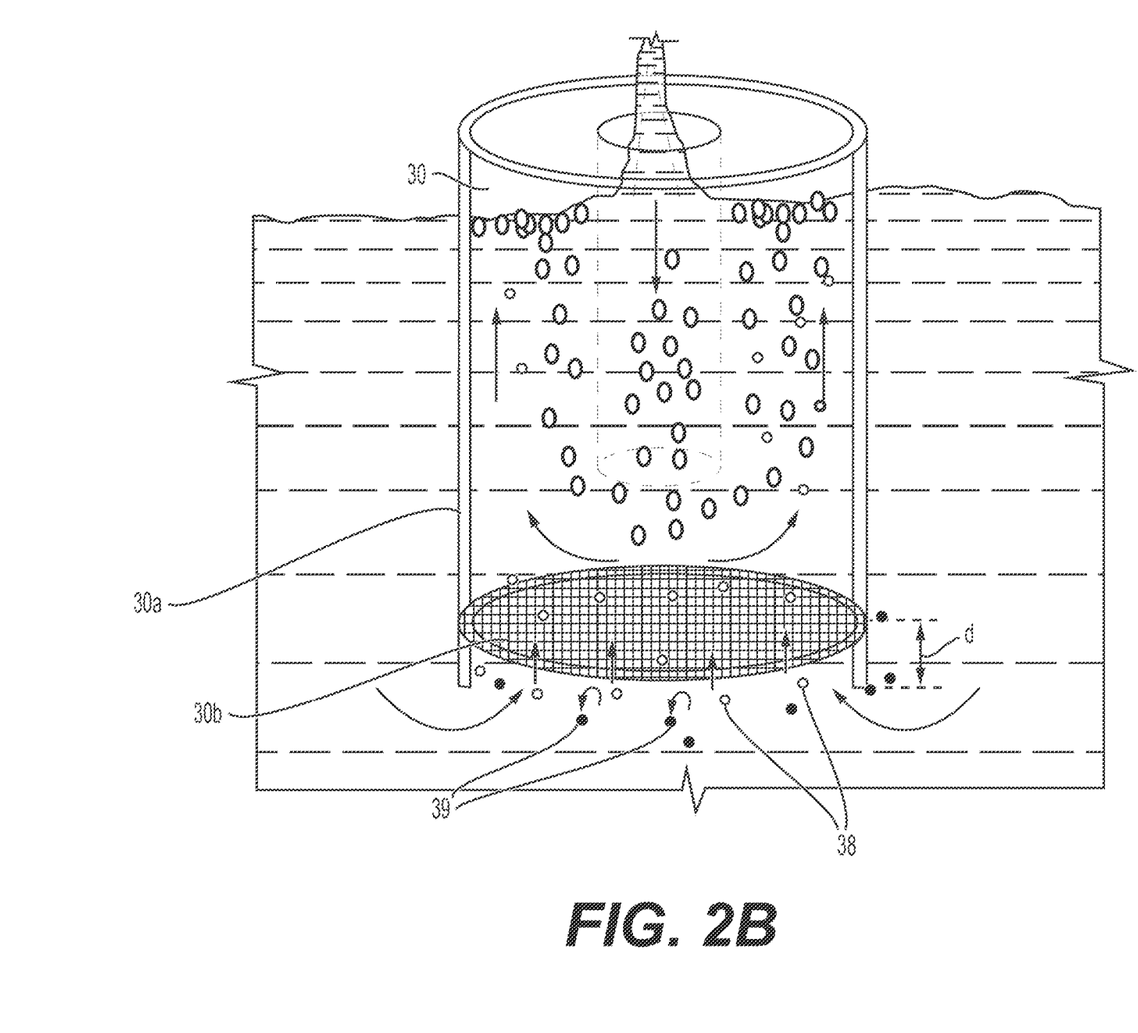
FIG. 2B is an embodiment of a filter having an impermeable vertical wall and base formed by a semi-permeable membrane.

FIG. 2A shows an embodiment where both the vertical sidewall 30a and base 30b of filter 30 are semi-permeable membranes. The height H and surface area of the active membrane, thickness t, and location d of the base membrane are some of the influencing operating conditions in addition to those of the plunging liquid jet reactor (e.g. jet length, jet velocity, nozzle geometry, downcomer length and diameter and annulus dimension). FIG. 2B shows an embodiment where the vertical sidewall 30a is an impermeable wall and only base 30b is a semi-permeable membrane.

Figure 3:
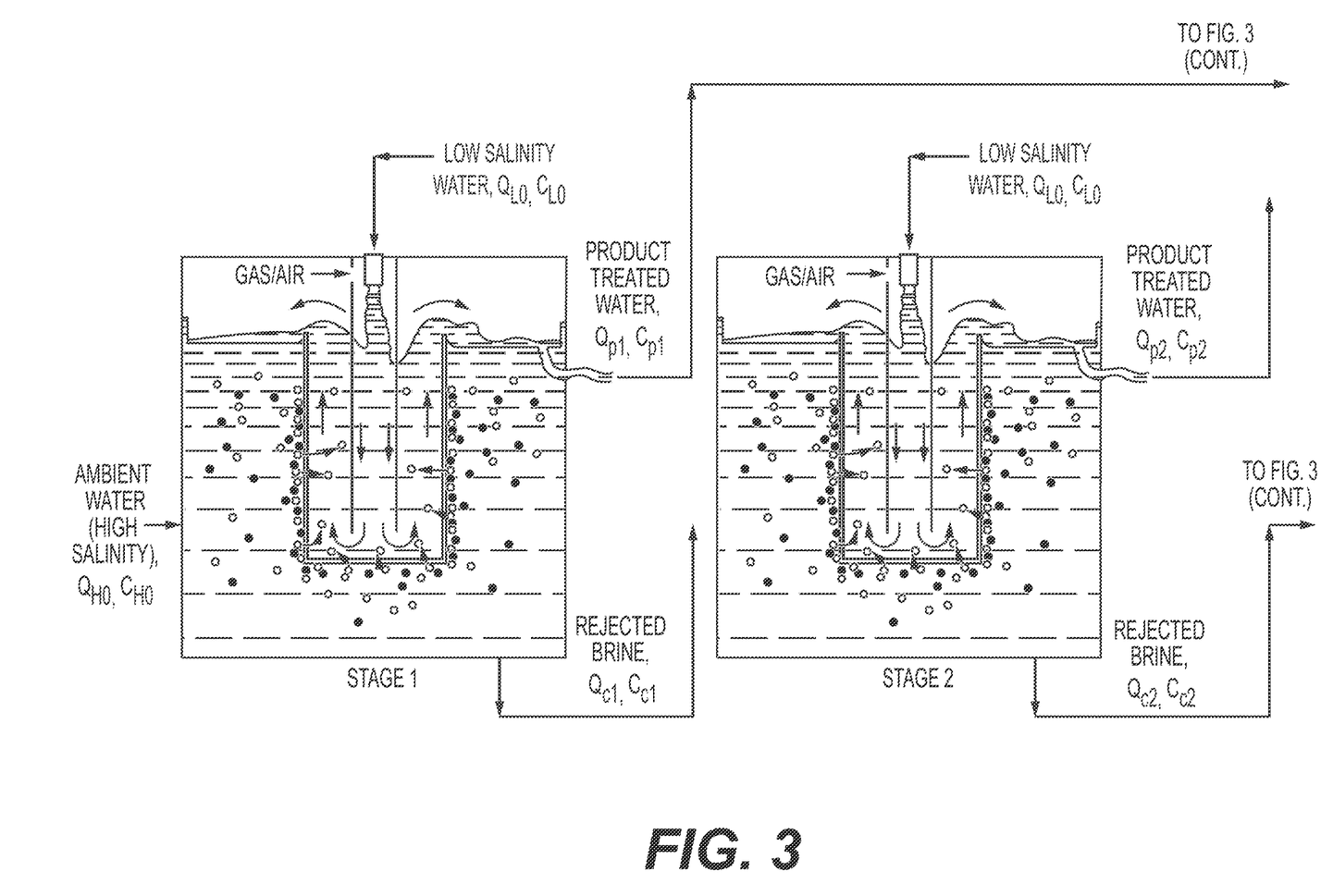
FIG. 3 is a diagram of a multi-stage plunging liquid jet reactor and water treatment system.

FIG. 3 illustrates a multi-stage plunging liquid jet reactor and water treatment system, according to an embodiment. The system may be connected in the form of a multistage process to produce a higher flowrate of desalted water, in the case of a desalination process, and high salinity rejected brine. The concentration of the rejected brine increases along the process. The salinity concentration of incoming water through the nozzle would depend on the PLJR operating conditions affecting $\Delta P$ and $\Delta \pi$.

Calculation of Flowrate Up the Riser

Figure 4:
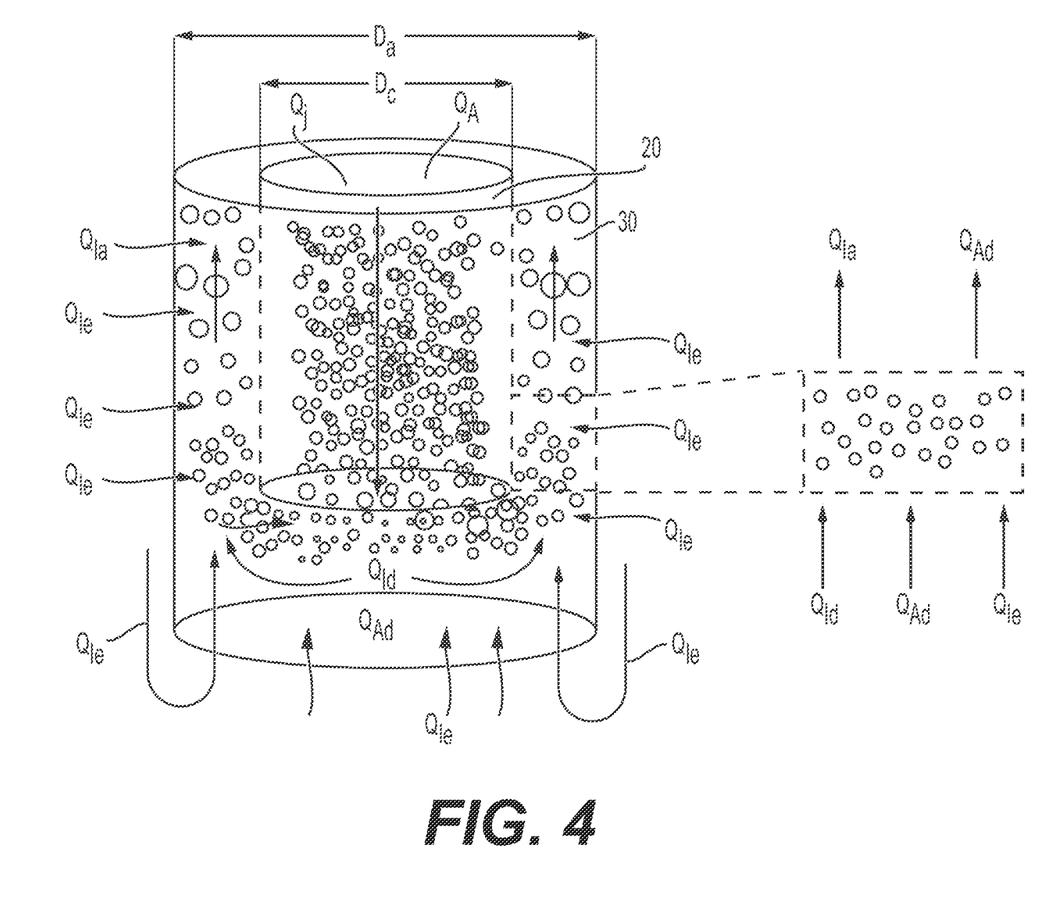
FIG. 4 is a diagram for discussion of properties of an air lift column of a plunging liquid jet reactor and water treatment system.

The following description with reference to FIG. 4 investigates methods to estimate the water flow rate ($Q_{Ia}$) through the annulus between the downcomer 20 and filter 30, which enables calculation of gas absorption. Water flow rate ($Q_{Ia}$) is determined through a model to predict the induced water flow ($Q_{Ie}$) in the annulus air-lift column surrounding the downcomer pipe which carries the air-water flow mixture produced by the plunging jet. The model is based on an energy balance carried out over the annulus. The voidage in the annulus is estimated using a drift model.

The central downcomer shown in FIG. 4 carries a water-air mixture with a water flow of $Q_{Id}$ and an air flow of $Q_{Ad}$. It is assumed that at the bottom of the downcomer both air and water flows stop moving downwards, this distance is controlled by the jet velocity and bubble buoyancy, and both the water and air then flow up the annulus. The density of the air-flow mixture in the annulus is lower than that in the surrounding tank. This density difference generates a hydrostatic force causing water from the tank to flow through the annulus membrane to start a desalination process ($Q_{le}$).

Figure 5:
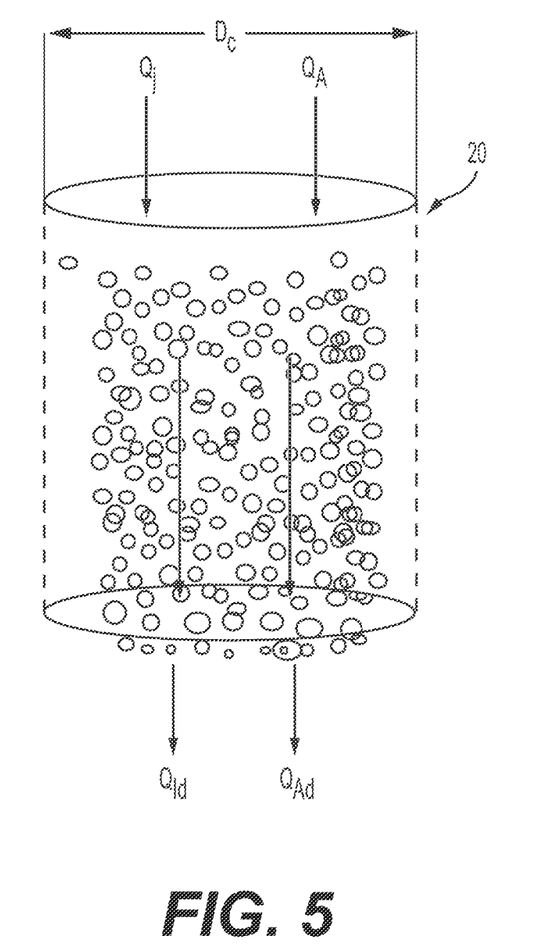
FIG. 5 is a diagram for discussion of properties of a downcomer used in a plunging liquid jet reactor and water treatment system.

The control volume of the downcomer 20 will be described with reference to FIG. 5. The material balance for each phase, liquid and gas, is performed separately to solve for the voidage $\varepsilon_d$ in the downcomer.

Liquid Phase

Jet flow rate is the same as the water flow rate inside the downcomer, thus cross sectional area of the downcomer is $$A_d = \frac{\pi D_c^2}{4}$$

The water superficial velocity inside the downcomer is equal to $$j_{ld} = \frac{4Q_j}{\pi D_c^2}$$

Gas Phase

A similar approach is applied to derive the superficial velocity for the gas phase inside the downcomer, $$Q_{Ad} = Q_A = A_d j_{Ad}$$

gas superficial velocity in the downcomer is $$j_{Ad} = \frac{4Q_A}{\pi D_c^2}$$

Figure 6:
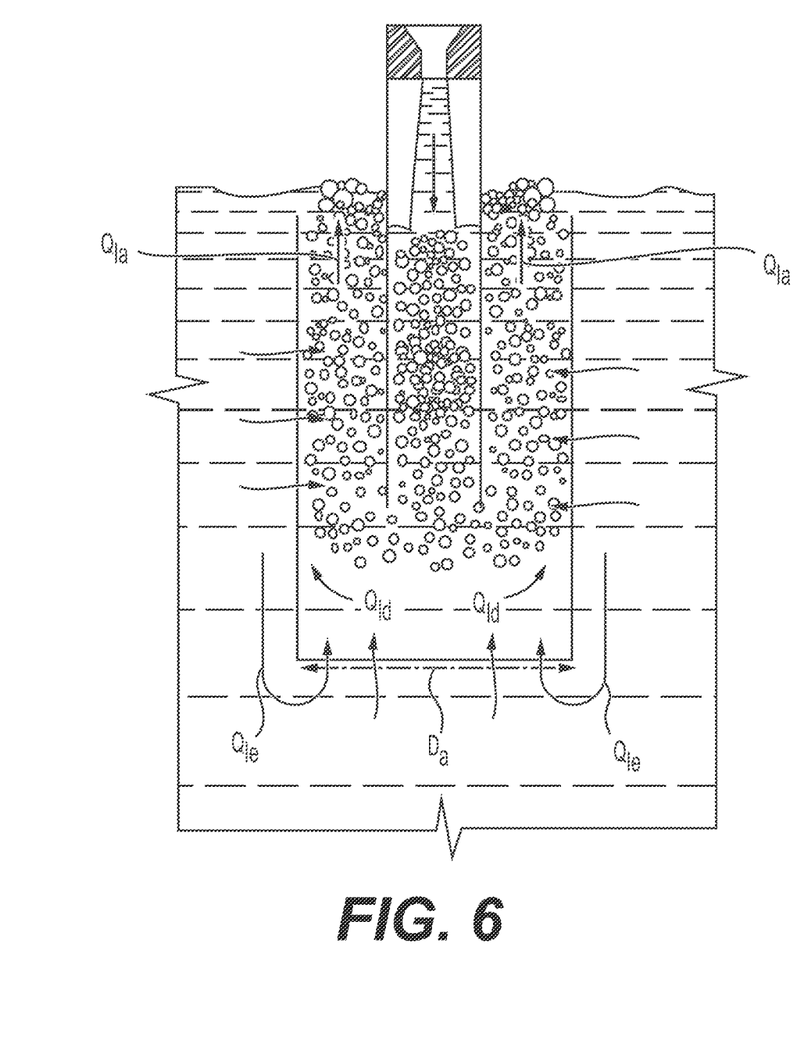
FIG. 6 is a diagram for discussion of a control volume of an annulus column of a plunging liquid jet reactor and water treatment system.

Referring to FIG. 6, a schematic of the annulus/annular riser as a control volume is provided. The liquid flowrate in the annulus comprises the new liquid entrainment rate induced through the filtration process of the annulus ($Q_{le}$) and the liquid flowrate from the downcomer ($Q_{ld}=Q_j$).

$$Q_{le} + Q_{ld} = Q_{la}$$

and cross-sectional area of the annulus is $$A_a = \frac{\pi(D_a^2 - D_{co}^2)}{4}$$

$$Q_{le} + Q_j = \frac{\pi(D_a^2 - D_{co}^2)}{4} j_{la}$$

since $Q_{ld}=Q_j$, superficial velocity of the liquid in the annulus is described by $$j_{la} = \frac{4(Q_{le} + Q_j)}{\pi(D_a^2 - D_{co}^2)}$$

Gas Phase

The same method is applied on the gas phase, however it is worth pointing out that in the case of the gas there is no gas being generated elsewhere. Therefore, the same amount of gas flowing down the downcomer is also flowing in the annulus. Thus, $$Q_A = A_a j_{Aa}$$

where $j_{Aa}$ is the superficial velocity of the gas in the annulus

Void Fraction

Generally, void fraction can be described by equations that relate the mean velocities ($\overline{V_A}$, $\overline{V_l}$) of the gas and liquid to the superficial velocities as shown below, $$j_A = \varepsilon \overline{V_A}$$

$$j_l = (1-\varepsilon)\overline{V_l}$$

Downcomer

The void fraction inside the downcomer can be described as $$\varepsilon_d = \frac{j_{Ad}}{\overline{V_{Ad}}}$$

and mean gas velocity as $$\overline{V_{Ad}} = C_0(j_{Ad} + j_{ld}) - V_{\infty d}$$

The terminal rise velocity of a bubble in a slug flow is found experimentally to be given by $$V_{\infty d} = 0.35\sqrt{gd_t}$$

which agrees with the theoretical prediction for churn-bubble flow:

$$V_{\infty d} = 1.53\left[\frac{\sigma g}{\rho_l}\right]^{1/4}$$

Where, $\Delta\rho = \rho_l$, therefore final expression that predicts voidage in the downcomer for slug flow regime is:

$$\varepsilon_d = \frac{j_{Ad}}{C_0(j_{Ad} + j_{ld}) - V_{\infty d}} = \frac{Q_A}{C_0(Q_A + Q_j) - V_{\infty d}A_d}$$

The same procedure is followed to derive an expression for void fraction inside the annulus including the new liquid entrainment flowrate ($Q_{le}$). The material balance is performed around the annulus (control volume) excluding the downcomer:

$$\varepsilon_a = \frac{j_{Ad}}{\overline{V_{Aa}}}$$

$$\overline{V_{Aa}} = C_0(j_{Aa} + j_{la}) + V_{\infty a}$$

replacing the superficial velocities with corresponding flow rates yields:

$$\overline{V_{Aa}} = C_0\left[\frac{4Q_A}{\pi(D_a^2 - D_c^2)} + \frac{4(Q_{le} + Q_j)}{\pi(D_a^2 - D_c^2)}\right] + V_{\infty a}$$

or $$\overline{V_{Aa}} = \frac{C_0}{A_a}(Q_A + Q_{le} + Q_j) + V_{\infty a}$$

the final expression that estimates the voidage in the annulus is:

$$\varepsilon_a = \frac{Q_A}{C_0(Q_A + Q_{le} + Q_j) + V_{\infty a}A_a} = \frac{Q_A}{C_0(Q_A + Q_{la}) + V_{\infty a}A_a}$$

For Slug Flow:

$$V_{\infty a} = 0.35\sqrt{gd_t}$$

For Chum-Bubble Flow:

$$V_{\infty a} = 1.53\left[\frac{\sigma g}{\rho_l}\right]^{1/4}$$

Figure 7:
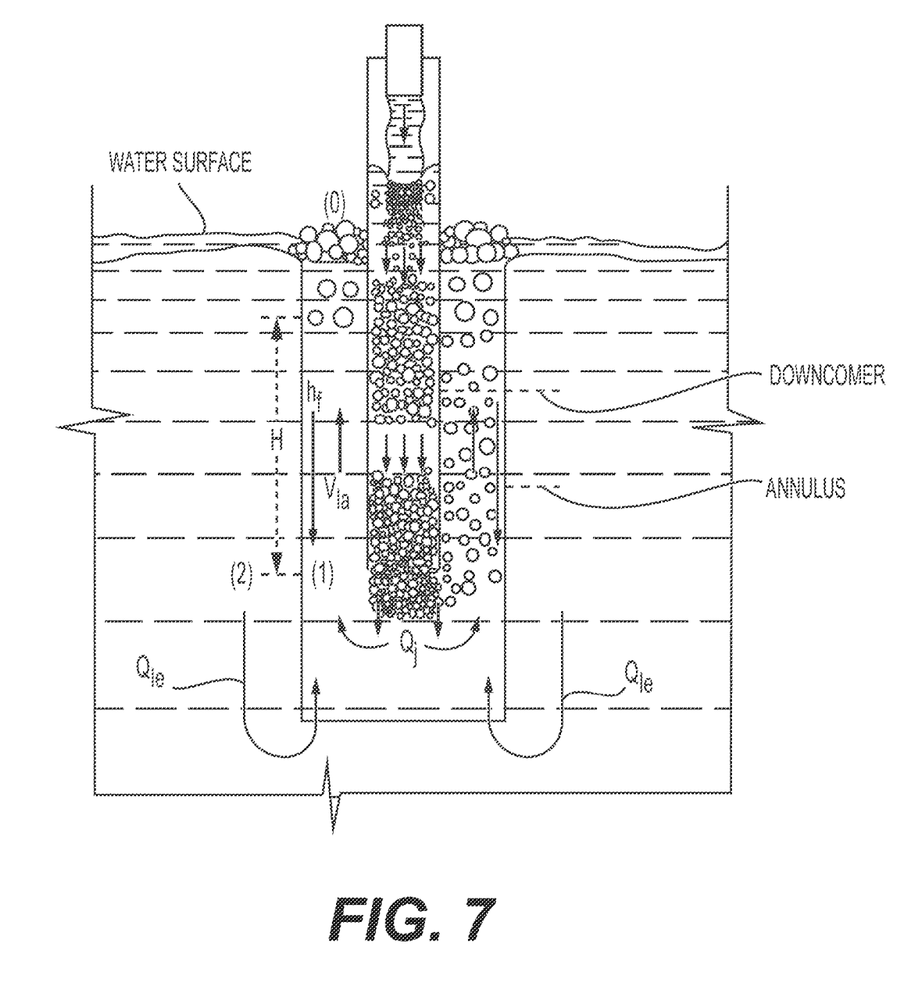
FIG. 7 is a diagram for discussion of an energy balance of an annulus column of a plunging liquid jet reactor and water treatment system.

Referring to FIG. 7, the energy associated with the two-phase mixture leaving the base of the downcomer is dissipated as the flow is brought to a halt by the bubble buoyancy and the induction of water flow through the annulus membrane/filter from the tank ($Q_{le}$). The depth that the bubbles will travel below the downcomer is controlled by the jet velocity and the bubble buoyancy. Considering these terms, the energy at point 1 can be predicted by the following equation, $$E_1 = \rho_1 \frac{V_{la1}^2}{2} + P_1 + P_0$$

The effect of the flow path when the two-phase flow changes direction is ignored.

Where $P_0$ is the atmospheric pressure above the water level and $P_1$ is made up of the following elements:
i. Hydrostatic head of the liquid above it, the hydrostatic component of the pressure gradient, which is $$\left(\frac{dp}{dl}\right)_H = \varepsilon_a \rho_g g + (1 - \varepsilon_a)\rho_l g.$$

The first term, head due to air bubbles, is negligible because air density is very small.
ii. Frictional pressure gradient in the annulus $$\left(\frac{dp}{dl}\right)_f$$

or the pressure loss due to the friction $P_f = h_f g \rho_l$.
Combining equations from i and ii gives $$P_1 = \underbrace{h_f g \rho_l}_{ii} + \underbrace{Hg(1 - \varepsilon_a)\rho_l}_{i}$$

and therefore the energy balance at point 1 is given by $$E_1 = \underbrace{\rho_1 \frac{V_{b1}^2}{2}}_{\text{Kinetic energy}} + \underbrace{h_f g \rho_1}_{\substack{\text{Frictional} \\ \text{pressure}}} + \underbrace{Hg(1 - \varepsilon_a)}_{\substack{\text{Hydrostatic} \\ \text{pressure}}} + \underbrace{P_0}_{\substack{\text{Atmospheric} \\ \text{pressure}}}$$

Because the water outside the annulus is assumed to be stagnant, the kinetic energy at this point is negligible (v≈0). Therefore, energy due to the hydrostatic head outside the annulus (clear water) is equal to $$E_2 = P_2 = H\rho_l g + P_0$$

Assuming that $\varepsilon_a$ is constant throughout the annulus in both vertical and radial directions, which probably depends on voidage and annulus diameter, and equating both energies at 1 and 2 (equations (3) and (4)) and solving for $\overline{V_{la}}$, yields $$\underbrace{\rho_l \frac{\overline{V_{la1}^2}}{2} + h_f g \rho_l + H g \rho_l(1 - \varepsilon_a) + P_0}_{E_1} = \underbrace{H\rho_l g + P_0}_{E_2}$$

Solving for the velocity in the annulus, $$\overline{V_{la}} = \sqrt{2g(H\varepsilon_a - h_f)}$$

where head loss due to friction ($h_f$) is evaluated by the following equation $$h_f = \left(\frac{dp}{dl}\right)_f \frac{H}{\rho_l g}$$

and $$\left(\frac{dp}{dl}\right)_f$$

can be estimated using a two-phase flow multiplier frictional pressure gradient model.

It is to be understood that the plunging liquid jet reactor and water treatment system is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A plunging liquid jet reactor and water treatment system, comprising:
    a supply tank holding supply water, the supply tank having one or more fluid inlets and one or more fluid outlets;
    a downcomer having an upper end and an open lower end, the downcomer defining a hollow column positioned within the supply tank;
    a pump and one or more conduits for pumping supply water;
    a nozzle mounted on the upper end of the downcomer, the nozzle configured to receive pressurized supply water from the pump and configured to generate a liquid jet downward in the hollow column;
    a filter surrounding the downcomer, the filter having one or more vertical sidewalls and a base wherein at least one wall of the filter or the base is a semi-permeable membrane; and
    a collection tray mounted between the filter and the supply tank for collecting treated water pushed upward through an annulus between the filter and downcomer, wherein a pressure difference is created between supply water surrounding the filter and water within the filter, the pressure difference causing water molecules from the supply water surrounding the filter to pass through the semi-permeable membrane.

2. A desalination process using the plunging fluid jet reactor and liquid treatment system of claim 1, wherein the supply tank holds saltwater and wherein the filter is a reverse osmosis filter.

3. The plunging liquid jet reactor and fluid treatment system as recited in claim 1, wherein the filter is an ultrafiltration filter.

4. The plunging liquid jet reactor and fluid treatment system as recited in claim 1, wherein the filter is a nanofiltration filter.

5. The plunging liquid jet reactor and fluid treatment system as recited in claim 1, wherein the filter is a microfiltration filter.

6. The plunging liquid jet reactor and fluid treatment system as recited in claim 1, further comprising a rotameter used to measure the flowrate of fluid from the pump to the nozzle.

7. The plunging liquid jet reactor and fluid treatment system as recited in claim 1, wherein the one or more vertical walls and base of the filter are semi-permeable membranes.

8. The plunging liquid jet reactor and fluid treatment system as recited in claim 1, wherein the one or more vertical walls of the filter are impermeable membranes and the base of the filter is a semi-permeable membrane.

9. A multi-stage fluid treatment system using two or more plunging liquid jet reactor and fluid treatment systems as recited in claim 1.

10. The plunging liquid jet reactor and fluid treatment system as recited in claim 1, wherein the pump circulates water from an outlet of the supply tank to the nozzle.

11. The plunging liquid jet reactor and fluid treatment system as recited in claim 1, wherein the pump circulates water from an external supply source to the nozzle.

12. The plunging liquid jet reactor and fluid treatment system as recited in claim 1, wherein the pump circulates water from an outlet of the supply tank to the nozzle and from an external supply source to the nozzle.

13. The plunging liquid jet reactor and fluid treatment system as recited in claim 1, wherein a portion of the treated water is fed into the supply water fed to the nozzle.

\* \* \* \* \*